(12) United States Patent
Reynolds, III et al.

(10) Patent No.: US 6,503,652 B2
(45) Date of Patent: Jan. 7, 2003

(54) FUEL CELL ASSEMBLY METHOD WITH SELECTIVE CATALYST LOADING

(75) Inventors: Robert Anderson Reynolds, III, Bay Village, OH (US); Robert Angelo Mercuri, Seven Hills, OH (US)

(73) Assignee: Graftech Inc., Wilmington, DE (US)

( * ) Notice: Subject to any disclaimer, the term of this patent is extended or adjusted under 35 U.S.C. 154(b) by 0 days.

(21) Appl. No.: 09/871,882

(22) Filed: Jun. 1, 2001

(65) Prior Publication Data

US 2002/0022570 A1 Feb. 21, 2002

Related U.S. Application Data

(63) Continuation-in-part of application No. 09/606,511, filed on Jun. 29, 2000, now Pat. No. 6,413,663.

(51) Int. Cl.$^7$ ................................................ H01M 2/02
(52) U.S. Cl. ........................ 429/34; 429/36; 429/39; 429/40; 29/523.1; 29/623.3; 29/623.5
(58) Field of Search ............................... 429/34, 36, 39, 429/40; 629/623.1; 29/623.3, 623.5

(56) References Cited

U.S. PATENT DOCUMENTS

| | | | |
|---|---|---|---|
| 3,404,061 A | 10/1968 | Shane et al. | 161/125 |
| 4,136,059 A | 1/1979 | Jalan et al. | 252/447 |
| 4,190,257 A | 2/1980 | Schnitzler | 277/102 |
| 4,226,821 A | 10/1980 | Ishikawa et al. | 264/134 |
| 4,513,094 A | 4/1985 | Luczak | 502/101 |
| 4,652,537 A | 3/1987 | Tamura et al. | 502/5 |
| 4,752,518 A | 6/1988 | Lohrke et al. | 428/131 |
| 4,826,181 A | 5/1989 | Howard | 277/112 |
| 4,891,279 A * | 1/1990 | Joo et al. | 429/40 |
| 4,895,713 A | 1/1990 | Greinke et al. | 423/448 |
| 4,988,583 A | 1/1991 | Watkins et al. | 429/30 |
| 5,102,855 A | 4/1992 | Greinke et al. | 502/425 |
| 5,108,849 A | 4/1992 | Watkins et al. | 429/30 |
| 5,176,863 A | 1/1993 | Howard | 264/113 |
| 5,225,262 A | 7/1993 | Leduc | 428/75 |
| 5,225,379 A | 7/1993 | Howard | 501/99 |
| 5,228,701 A | 7/1993 | Greinke et al. | 277/102 |

(List continued on next page.)

FOREIGN PATENT DOCUMENTS

| | | | |
|---|---|---|---|
| EP | 0248918 | 6/1986 | |
| JP | 54088911 | 7/1979 | C04B/33/32 |
| JP | 63157747 | 6/1988 | B22D/11/10 |
| JP | 63242395 | 10/1988 | C02F/3/10 |
| JP | 1123991 | 5/1989 | |
| JP | 8143856 | 6/1996 | C09K/3/10 |
| JP | 8169478 | 7/1996 | B65D/81/34 |

OTHER PUBLICATIONS

WO 95/16287. David P. Wilkison et al. Embossed Fluid Field Plate for Electrochemical Fuel Cells Publication Dated Jun. 15, 1995.

Primary Examiner—Carol Chaney
Assistant Examiner—Dah-Wei D. Yuan
(74) Attorney, Agent, or Firm—Waddey & Patterson; Lucian Wayne Beavers

(57) ABSTRACT

A method of manufacturing an electrode for an electrochemical fuel cell is disclosed, comprising providing a sheet of compressed mass of expanded graphite particles having a plurality of perforations defined by walls of the expanded graphite particles, and the perforations passing through the sheet between first and second opposed surfaces of the sheet; coating the sheet with a thermosettable organic resin, said coating step comprising filling a portion of said perforations with the thermosettable organic resin; curing and baking the sheet, and reopening a portion of the filled perforations during the curing and baking step; activating the thermosettable organic resin to form a high surface area carbon on the walls of the perforations; and loading a catalyst onto the high surface area carbon.

23 Claims, 7 Drawing Sheets

U.S. PATENT DOCUMENTS

| | | | |
|---|---|---|---|
| 5,300,370 A | 4/1994 | Washington et al. | 429/34 |
| 5,476,679 A | 12/1995 | Lewis et al. | 427/122 |
| 5,494,506 A | 2/1996 | Ford et al. | 55/502 |
| 5,531,454 A | 7/1996 | Borneby | 277/26 |
| 5,593,934 A | 1/1997 | Stonehart | 502/326 |
| 5,683,778 A | 11/1997 | Crosier | 428/59 |
| 5,707,755 A | 1/1998 | Grot | 429/40 |
| 5,902,762 A | 5/1999 | Mercuri et al. | 501/99 |
| 5,976,726 A | 11/1999 | Wilkinson et al. | 429/35 |
| 5,981,098 A | 11/1999 | Vitale | 429/34 |
| 6,087,034 A * | 7/2000 | Mercuri | 429/44 |

* cited by examiner

FUEL CELL ASSEMBLY METHOD WITH SELECTIVE CATALYST LOADING

RELATED APPLICATIONS

This application is a continuation-in-part of U.S. patent application Ser. No. 09/606,511, filed Jun. 29, 2000, now U.S. No. 6,413,663 of R.A. Mercuri, entitled "Fluid Permeable Flexible Graphite Fuel Cell Electrode", the details of which are incorporated herein by reference.

TECHNICAL FIELD

This invention relates to a process for manufacturing a component such as an electrode for an electrochemical fuel cell that includes an article formed of flexible graphite sheet that is fluid permeable and has enhanced isotropy with respect to thermal and electrical conductivity. The graphite article has catalyst material selectively loaded thereon.

BACKGROUND OF THE INVENTION

An ion exchange membrane fuel cell, more specifically a proton exchange membrane (PEM) fuel cell, produces electricity through the chemical reaction of hydrogen and oxygen in the air. Within the fuel cell, electrodes denoted as anode and cathode surround a polymer electrolyte to form what is generally referred to as a membrane electrode assembly, or MEA. Often times, the electrodes also function as the gas diffusion layer (or GDL) of the fuel cell. A catalyst material stimulates hydrogen molecules to split into hydrogen atoms and then, at the membrane, the atoms each split into a proton and an electron. The electrons are utilized as electrical energy. The protons migrate through the electrolyte and combine with oxygen and electrons to form water.

A PEM fuel cell is advantageously formed of a membrane electrode assembly sandwiched between two graphite flow field plates. Conventionally, the membrane electrode assembly consists of random-oriented carbon fiber paper electrodes (anode and cathode) with a thin layer of a catalyst material, particularly platinum or a platinum group metal, or an alloy containing a platinum group metal, coated on isotropic carbon particles, such as lamp black, bonded to either side of a proton exchange membrane disposed between the electrodes. In operation, hydrogen flows through channels in one of the flow field plates to the anode, where the catalyst promotes its separation into hydrogen atoms and thereafter into protons that pass through the membrane and electrons that flow through an external load. Air flows through the channels in the other flow field plate to the cathode, where the oxygen in the air is separated into oxygen atoms, which joins with the protons through the proton exchange membrane and the electrons through the circuit, and combine to form water. Since the membrane is an insulator, the electrons travel through an external circuit in which the electricity is utilized, and join with protons at the cathode. An air stream on the cathode side is one mechanism by which the water formed by combination of the hydrogen and oxygen is removed. Combinations of such fuel cells are used in a fuel cell stack to provide the desired voltage.

One limiting factor to the more widespread use of PEM fuel cells is the cost of the catalyst material. Metals such as platinum and the other platinum group metals are relatively expensive, especially as compared to the other elements of the cell, such as the graphite flow field plates. In conventional fuel cells, the catalyst material is bonded to the PEM or the electrodes in a non-selective manner. That is, the catalyst material is distributed relatively uniformly on the opposed surfaces of the PEM, with result that catalyst deployment is not as efficient as possible.

Graphites are made up of layer planes of hexagonal arrays or networks of carbon atoms. These layer planes of hexagonally arranged carbon atoms are substantially flat and are oriented or ordered so as to be substantially parallel and equidistant to one another. The substantially flat, parallel equidistant sheets or layers of carbon atoms, usually referred to as graphene layers or basal planes, are linked or bonded together and groups thereof are arranged in crystallites. Highly ordered graphites consist of crystallites of considerable size: the crystallites being highly aligned or oriented with respect to each other and having well ordered carbon layers. In other words, highly ordered graphites have a high degree of preferred crystallite orientation. It should be noted that graphite exhibits anisotropy because of its inherent structure and thus exhibit or possess many properties that are highly directional e.g. thermal and electrical conductivity and fluid diffusion. Briefly, graphites may be characterized as laminated structures of carbon, that is, structures consisting of superposed layers or laminae of carbon atoms joined together by weak van der Waals forces. In considering the graphite structure, two axes or directions are usually noted, to wit, the "c" axis or direction and the "a" axes or directions. For simplicity, the "c" axis or direction may be considered as the direction perpendicular to the carbon layers. The "a" axes or directions may be considered as the directions parallel to the carbon layers or the directions perpendicular to the "c" direction. The graphites suitable for manufacturing flexible graphite possess a very high degree of orientation.

As noted above, the bonding forces holding the parallel layers of carbon atoms together are only weak van der Waals forces. Natural graphites can be treated so that the spacing between the superposed carbon layers or laminae can be appreciably opened up so as to provide a marked expansion in the direction perpendicular to the layers, that is, in the "c" direction and thus form an expanded or intumesced graphite structure in which the laminar character of the carbon layers is substantially retained.

Natural graphite flake which has been greatly expanded and more particularly expanded so as to have a final thickness or "c" direction dimension which is as much as about 80 or more times the original "c" direction dimension can be formed without the use of a binder into cohesive or integrated flexible graphite sheets of expanded graphite, e.g. webs, papers, strips, tapes, or the like. The formation of graphite particles which have been expanded to have a final thickness or "c" dimension which is at least about 80 times the original "c" direction dimension into integrated flexible sheets by compression, without the use of any binding material is believed to be possible due to the excellent mechanical interlocking, or cohesion which is achieved between the voluminously expanded graphite particles.

In addition to flexibility, the sheet material, as noted above, has also been found to possess a high degree of anisotropy with respect to thermal and electrical conductivity and fluid diffusion, comparable to the natural graphite starting material due to orientation of the expanded graphite particles substantially parallel to the opposed faces of the sheet resulting from very high compression, e.g. roll pressing. Sheet material thus produced has excellent flexibility, good strength and a very high degree of orientation.

Briefly, the process of producing flexible, binderless anisotropic graphite sheet material, e.g. web, paper, strip, tape, foil, mat, or the like, comprises compressing or compacting under a predetermined load and in the absence of a binder, expanded graphite particles which have a "c" direction dimension which can vary between up to about 10 times and as much as about 80 times or greater than that of the original particles so as to form a substantially flat, flexible, integrated graphite sheet. The expanded graphite particles which generally are worm-like or vermiform in appearance, once compressed, will maintain the compression set and alignment with the opposed major surfaces of the sheet. The density and thickness of the sheet material can be varied by controlling the degree of compression. The density of the sheet material can be within the range of from about 5 pounds per cubic foot to about 125 pounds per cubic foot. The flexible graphite sheet material exhibits an appreciable degree of anisotropy due to the alignment of graphite particles parallel to the major opposed, parallel surfaces of the sheet, with the degree of anisotropy increasing upon roll pressing of the sheet material to increased density. In roll pressed anisotropic sheet material, the thickness, i.e. the direction perpendicular to the opposed, parallel sheet surfaces comprises the "c" direction and the directions ranging along the length and width, i.e. along or parallel to the opposed, major surfaces comprises the "a" directions and the thermal, electrical and fluid diffusion properties of the sheet are very different, by orders of magnitude, for the "c" and "a" directions.

SUMMARY OF THE INVENTION

The present invention provides a process for manufacturing articles useful in a membrane electrode assembly for an electrochemical fuel cell comprising a pair of electrodes and an ion exchange membrane positioned between the electrodes, at least one of the electrodes being formed of a sheet of a compressed mass of expanded graphite particles having a plurality of transverse fluid channels (or perforations) passing through the sheet between first and second opposed surfaces of the sheet, one of the opposed surfaces abutting the ion exchange membrane.

The transverse fluid channels, or perforations may be formed by mechanically impacting an opposed surface of the sheet to displace graphite within the sheet at predetermined locations. The transverse fluid channels are adjacently positioned and separated by walls of compressed expanded graphite.

In the operation of a PEM fuel cell the chemical reactions typically occur at specific places in the system. These reactions primarily occur at the interface of three components : the electrode (or gas diffusion layer), the membrane, and the catalyst. In the present invention, at least a portion of the walls of at least some of the transverse fluid channels have an adherent coating of activated carbon thereon or activated carbon distributed therein, the activated carbon loaded with catalyst.

More specifically, the process of the present invention selectively generates high surface area activated carbon that can be used as a catalyst support on the surface of an electrode or gas diffusion layer. A graphite sheet is perforated as described below and a resin such as a carbonizing phenolic or epoxy resin is applied to the surface. The resin is applied such that the channels or perforations are at least partially filled with the resin. Most preferably, all of the channels are filled with resin. At least a portion of the channels are filled.

The sheet is then cured and baked. The curing and baking shrinks the resin, and the resin adheres to the edges of the perforations. Also, because of the shrinkage the perforations reopen, allowing for the transport of fuel gasses and water. Most preferably, all the filed holes are reopened. At least a portion of the filled holed are reopened.

Preferably the portion of holes that are both filled and reopened is at least about 20%, more preferably greater than about 50%, and most preferably about 100% of the holes in the sheet.

The resin that is now selectively placed on the edges of and inside the perforations can be activated by various methods including those discussed below, producing a high surface area carbon attached to the edges and within the perforations. This high surface area carbon can then be loaded with a catalyst.

In one embodiment of the present invention, a method of manufacturing an electrode for an electrochemical fuel cell is disclosed, comprising providing a sheet of compressed mass of expanded graphite particles having a plurality of perforations defined by walls of the expanded graphite particles, and the perforations passing through the sheet between first and second opposed surfaces of the sheet; coating the sheet with a thermosettable organic resin, said coating step comprising filling a portion of said perforations with the thermosettable organic resin; curing and baking the sheet, and reopening a portion of the filled perforations during the curing and baking step; activating the thermosettable organic resin to form a high surface area carbon on the walls of the perforations; and loading a catalyst onto the high surface area carbon.

In another embodiment of the present invention, a method for manufacturing a component for a fuel cell is disclosed, the method comprising providing a sheet of a compressed mass of graphite particles having a plurality of transverse fluid channels having walls defined by the graphite particles and said transverse fluid channels passing through the sheet between first and second parallel, opposed surfaces of the sheet; filling a portion of said transverse fluid channels with a thermosettable resin; reopening said transverse fluid channels by curing and baking said sheet to selectively place the resin on the walls of a portion of the transverse fluid channels; activating said resin producing a high surface area carbon attached to a portion of the walls of the transverse fluid channels; and loading a catalyst to a portion of the high surface area carbon.

DETAILED DESCRIPTION OF THE INVENTION

Figure 1:
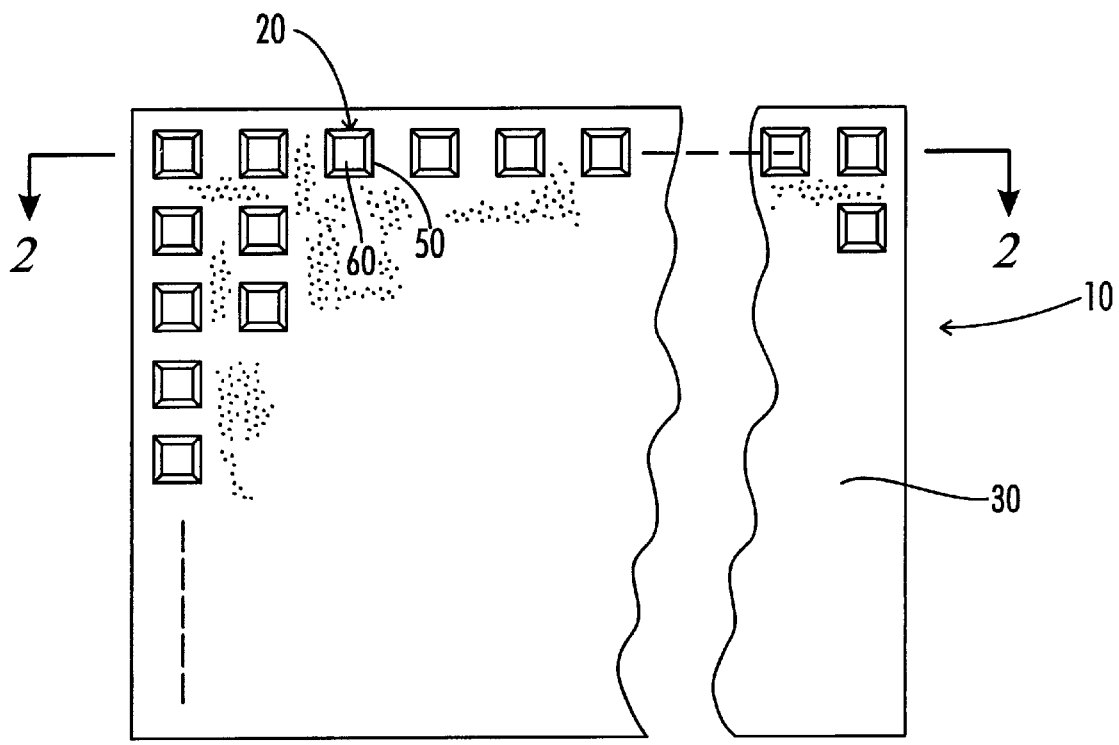
FIG. 1 is a plan view of a transversely permeable sheet of flexible graphite having transverse channels or perforations.
Figure 1A:
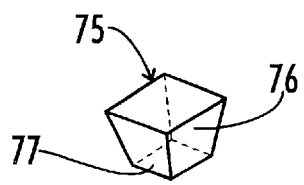
FIG. 1(A) shows a flat-ended protrusion element used in making the channels in the perforated sheet of FIG. 1.

Graphite is a crystalline form of carbon comprising atoms covalently bonded in flat layered planes with weaker bonds between the planes. By treating particles of graphite, such as natural graphite flake, with an intercalant of, e.g. a solution of sulfuric and nitric acid, the crystal structure of the graphite reacts to form a compound of graphite and the intercalant. The treated particles of graphite are hereafter referred to as "particles of intercalated graphite." Upon exposure to high temperature, the intercalant within the graphite decomposes and volatilizes, causing the particles of intercalated graphite to expand in dimension as much as about 80 or more times its original volume in an accordion-like fashion in the "c" direction, i.e. in the direction perpendicular to the crystalline planes of the graphite. The exfoliated graphite particles are vermiform in appearance, and are therefore commonly referred to as worms. The worms may be compressed together into flexible sheets that, unlike the original graphite flakes, can be formed and cut into various shapes and provided with small transverse openings by deforming mechanical impact.

Graphite starting materials suitable for use in the present invention include highly graphitic carbonaceous materials capable of intercalating organic and inorganic acids as well as halogens and then expanding when exposed to heat. These highly graphitic carbonaceous materials most preferably have a degree of graphitization of about 1.0. As used in this disclosure, the term "degree of graphitization" refers to the value g according to the formula:

$$g = 3.45 - d(002)/0.095$$

where $d(002)$ is the spacing between the graphitic layers of the carbons in the crystal structure measured in Angstrom units. The spacing d between graphite layers is measured by standard X-ray diffraction techniques. The positions of diffraction peaks corresponding to the (002), (004) and (006) Miller Indices are measured, and standard least-squares techniques are employed to derive spacing which minimizes the total error for all of these peaks. Examples of highly graphitic carbonaceous materials include natural graphites from various sources, as well as other carbonaceous materials such as carbons prepared by chemical vapor deposition and the like. Natural graphite is most preferred.

The graphite starting materials used in the present invention may contain non-carbon components so long as the crystal structure of the starting materials maintains the required degree of graphitization and they are capable of exfoliation. Generally, any carbon-containing material, the crystal structure of which possesses the required degree of graphitization and which can be exfoliated, is suitable for use with the present invention. Such graphite preferably has an ash content of less than six weight percent. More preferably, the graphite employed for the present invention will have a purity of at least about 98%. In the most preferred embodiment, the graphite employed will have a purity of at least about 99%.

A common method for manufacturing graphite sheet is described by Shane et al. in U.S. Pat. No. 3,404,061, the disclosure of which is incorporated herein by reference. In the typical practice of the Shane et al. method, natural graphite flakes are intercalated by dispersing the flakes in a solution containing e.g., a mixture of nitric and sulfuric acid, advantageously at a level of about 20 to about 300 parts by weight of intercalant solution per 100 parts by weight of graphite flakes (pph). The intercalation solution contains oxidizing and other intercalating agents known in the art. Examples include those containing oxidizing agents and oxidizing mixtures, such as solutions containing nitric acid, potassium chlorate, chromic acid, potassium permanganate, potassium chromate, potassium dichromate, perchloric acid, and the like, or mixtures, such as for example, concentrated nitric acid and chlorate, chromic acid and phosphoric acid, sulfuric acid and nitric acid, or mixtures of a strong organic acid, e.g. trifluoroacetic acid, and a strong oxidizing agent soluble in the organic acid. Alternatively, an electric potential can be used to bring about oxidation of the graphite. Chemical species that can be introduced into the graphite crystal using electrolytic oxidation include sulfuric acid as well as other acids.

In a preferred embodiment, the intercalating agent is a solution of a mixture of sulfuric acid, or sulfuric acid and phosphoric acid, and an oxidizing agent, i.e. nitric acid, perchloric acid, chromic acid, potassium permanganate, hydrogen peroxide, iodic or periodic acids, or the like. Although less preferred, the intercalation solution may contain metal halides such as ferric chloride, and ferric chloride mixed with sulfuric acid, or a halide, such as bromine as a solution of bromine and sulfuric acid or bromine in an organic solvent.

The quantity of intercalation solution may range from about 20 to about 150 pph and more typically about 50 to about 120 pph. After the flakes are intercalated, any excess solution is drained from the flakes and the flakes are water-washed. Alternatively, the quantity of the intercalation solution may be limited to between about 10 and about 50 pph, which permits the washing step to be eliminated as taught and described in U.S. Pat. No. 4,895,713, the disclosure of which is also herein incorporated by reference.

The particles of graphite flake treated with intercalation solution can optionally be contacted, e.g. by blending, with a reducing organic agent selected from alcohols, sugars, aldehydes and esters which are reactive with the surface film of oxidizing intercalating solution at temperatures in the range of 25° C. and 125° C. Suitable specific organic agents include hexadecanol, octadecanol, 1-octanol, 2-octanol, decylalcohol, 1,10 decanediol, decylaldehyde, 1-propanol, 1,3 propanediol, ethyleneglycol, polypropylene glycol, dextrose, fructose, lactose, sucrose, potato starch, ethylene glycol monostearate, diethylene glycol dibenzoate, propylene glycol monostearate, glycerol monostearate, dimethyl oxylate, diethyl oxylate, methyl formate, ethyl formate, ascorbic acid and lignin-derived compounds, such as sodium lignosulfate. The amount of organic reducing agent is suitably from about 0.5 to 4% by weight of the particles of graphite flake.

The use of an expansion aid applied prior to, during or immediately after intercalation can also provide improvements. Among these improvements can be reduced exfoliation temperature and increased expanded volume (also referred to as "worm volume"). An expansion aid in this context will advantageously be an organic material sufficiently soluble in the intercalation solution to achieve an improvement in expansion. More narrowly, organic materials of this type that contain carbon, hydrogen and oxygen, preferably exclusively, may be employed. Carboxylic acids have been found especially effective. A suitable carboxylic acid useful as the expansion aid can be selected from aromatic, aliphatic or cycloaliphatic, straight chain or branched chain, saturated and unsaturated monocarboxylic acids, dicarboxylic acids and polycarboxylic acids which have at least 1 carbon atom, and preferably up to about 15 carbon atoms, which is soluble in the intercalation solution in amounts effective to provide a measurable improvement of one or more aspects of exfoliation. Suitable organic solvents can be employed to improve solubility of an organic expansion aid in the intercalation solution.

Representative examples of saturated aliphatic carboxylic acids are acids such as those of the formula $H(CH_2)_n COOH$ wherein n is a number of from 0 to about 5, including formic, acetic, propionic, butyric, pentanoic, hexanoic, and the like. In place of the carboxylic acids, the anhydrides or reactive carboxylic acid derivatives such as alkyl esters can also be employed. Representative of alkyl esters are methyl formate and ethyl formate. Sulfuric acid, nitric acid and other known aqueous intercalants have the ability to decompose formic acid, ultimately to water and carbon dioxide. Because of this, formic acid and other sensitive expansion aids are advantageously contacted with the graphite flake prior to immersion of the flake in aqueous intercalant. Representative of dicarboxylic acids are aliphatic dicarboxylic acids having 2–12 carbon atoms, in particular oxalic acid, fumaric acid, malonic acid, maleic acid, succinic acid, glutaric acid, adipic acid, 1,5-pentanedicarboxylic acid, 1,6-hexanedicarboxylic acid, 1,10-decanedicarboxylic acid, cyclohexane-1,4-dicarboxylic acid and aromatic dicarboxylic acids such as phthalic acid or terephthalic acid. Representative of alkyl esters are dimethyl oxylate and diethyl oxylate. Representative of cycloaliphatic acids is cyclohexane carboxylic acid and of aromatic carboxylic acids are benzoic acid, naphthoic acid, anthranilic acid, p-aminobenzoic acid, salicylic acid, o-, m- and p-tolyl acids, methoxy and ethoxybenzoic acids, acetoacetamidobenzoic acids and, acetamidobenzoic acids, phenylacetic acid and naphthoic acids. Representative of hydroxy aromatic acids are hydroxybenzoic acid, 3-hydroxy-1-naphthoic acid, 3-hydroxy-2-naphthoic acid, 4-hydroxy-2-naphthoic acid, 5-hydroxy-1-naphthoic acid, 5-hydroxy-2-naphthoic acid, 6-hydroxy-2-naphthoic acid and 7-hydroxy-2-naphthoic acid. Prominent among the polycarboxylic acids is citric acid.

The intercalation solution will be aqueous and will preferably contain an amount of expansion aid of from about 1 to 10%, the amount being effective to enhance exfoliation. In the embodiment wherein the expansion aid is contacted with the graphite flake prior to or after immersing in the aqueous intercalation solution, the expansion aid can be admixed with the graphite by suitable means, such as a V-blender, typically in an amount of from about 0.2% to about 10% by weight of the graphite flake.

After intercalating the graphite flake, and following the blending of the intercalant coated intercalated graphite flake with the organic reducing agent, the blend is exposed to temperatures in the range of 25° to 125° C. to promote reaction of the reducing agent and intercalant coating. The heating period is up to about 20 hours, with shorter heating periods, e.g., at least about 10 minutes, for higher temperatures in the above-noted range. Times of one half hour or less, e.g., on the order of 10 to 25 minutes, can be employed at the higher temperatures.

The thus treated particles of graphite are sometimes referred to as "particles of intercalated graphite." Upon exposure to high temperature, e.g. temperatures of at least about 160° C. and especially about 700° C. to 1000° C. and higher, the particles of intercalated graphite expand as much as about 80 to 1000 or more times their original volume in an accordion-like fashion in the c-direction, i.e. in the direction perpendicular to the crystalline planes of the constituent graphite particles. The expanded, i.e. exfoliated, graphite particles are vermiform in appearance, and are therefore commonly referred to as worms. The worms may be compressed together into flexible sheets that, unlike the original graphite flakes, can be formed and cut into various shapes and provided with small transverse openings by deforming mechanical impact as hereinafter described.

Flexible graphite sheet and foil are coherent, with good handling strength, and are suitably compressed, e.g. by roll-pressing, to a thickness of about 0.07 to 4.0 millimeters ("mm") and a density of about 0.1 to 1.4 grams per cubic centimeter. From about 1.5–30% by weight of ceramic additives, can be blended with the intercalated graphite flakes as described in U.S. Pat. No. 5,902,762 (which is incorporated herein by reference) to provide enhanced resin impregnation in the final flexible graphite product. The additives include ceramic fiber particles having a length of about 0.15 to 1.5 mm. The width of the particles is suitably from about 0.04 to 0.004 mm. The ceramic fiber particles are non-reactive and non-adhering to graphite and are stable at temperatures up to about 1100° C., preferably at least about 1400° C. Suitable ceramic fiber particles are formed of macerated quartz glass fibers, carbon and graphite fibers, zirconia, boron nitride, silicon carbide and magnesia fibers, naturally occurring mineral fibers such as calcium metasilicate fibers, calcium aluminum silicate fibers, aluminum oxide fibers and the like.

The flexible graphite sheet can also, at times, be advantageously treated with resin and the absorbed resin, after curing, enhances the moisture resistance and handling strength, i.e. stiffness, of the flexible graphite sheet as well as "fixing" the morphology of the sheet. Suitable resin content is preferably at least about 5% by weight, more preferably about 10 to 35% by weight, and suitably up to about 60% by weight. Resins found especially useful in the practice of the present invention include acrylic-, epoxy- and phenolic-based resin systems, or mixtures thereof. Suitable epoxy resin systems include those based on diglycidyl ether or bisphenol A (DGEBA) and other multifunctional resin systems; phenolic resins that can be employed include resole and novolak phenolics.

In the practice of this invention, the flexible graphite sheet is initially provided with channels or perforations, which are preferably smooth-sided, and which pass between the parallel, opposed surfaces of the flexible graphite sheet, and are separated by walls of compressed expandable graphite. It is the upper edges of the walls of the flexible graphite sheet that actually abut the ion exchange membrane, when the inventive flexible graphite sheet functions as an electrode in an electrochemical fuel cell.

The channels preferably have openings on one of the opposed surfaces that are larger than the openings in the other opposed surface. The channels can have different configurations, which can be formed, for instance, using flat-ended protrusion elements of different shapes. The smooth flat-ends of the protrusion elements preferably ensure deformation and complete displacement of graphite within the flexible graphite sheet, i.e. there are no rough or ragged edges or debris resulting from the channel-forming impact. Preferred protrusion elements have decreasing cross-section in the direction away from the pressing roller to provide larger channel openings on the side of the sheet that is initially impacted. The development of smooth, unobstructed surfaces surrounding channel openings enables the free flow of fluid into and through smooth-sided channels. In a preferred embodiment, openings one of the opposed surfaces are larger than the channel openings in the other opposed surface, e.g. from 1 to 200 times greater in area, and result from the use of protrusion elements having converging sides. The channels are formed in the flexible graphite sheet at a plurality of locations by mechanical impact. The fact that channel locations can be predetermined can be extremely advantageous. For instance, the channels can be arrayed so as to lie contiguous with the fluid flow groove of a fuel cell fluid flow plate, thus ensuring that hydrogen and/or oxygen flow between the fluid flow plate and the membrane, through the inventive electrode is maximized or is at least as efficient as possible.

Preferably, the flexible graphite sheets of the present invention have a thickness of 0.07 mm to 0.4 mm adjacent the channels and a density of 0.5 to 1.4 grams per cubic centimeter, the preferred channel density (or count) is from 1000 to 3000 channels per square inch and the most preferred channel size is a channel in which the ratio of the area of larger channel opening to the smaller is from 50:1 to 150:1.

In the course of impacting the flexible graphite sheet to form channels, graphite is displaced within the sheet to disrupt and deform the parallel orientation of the expanded graphite particles. In effect the displaced graphite is being "die-molded" by the sides of adjacent protrusions and the smooth surface of the roller. This reduces the anisotropy in the flexible graphite sheet and thus increases the electrical and thermal conductivity of the sheet in the direction transverse to the opposed surfaces. A similar effect is achieved with frusto-conical and parallel-sided peg-shaped flat-ended protrusions.

Initially, the dried sheet is mechanically impacted to form transverse channels as described hereinabove. In order to provide an adherent coating of glassy carbon on the surfaces of at least some of the channels, i.e. on the walls of at least some of the channels, the sheet of compressed expanded graphite particles is coated with a thermosettable organic resin (such as a phenolic or epoxy resin) by means of roll, spray, gauge, or dip methods depending upon the coating thickness desired. Preferably, the sheet is coated by dipping or rolling. The coated sheet is heated to dry and set the resin (at a temperature of, e.g., about 100° to about 250° C. or higher); and the channeled sheet is heat treated, preferably in an inert atmosphere, to about 500° C.–1600° C. to form the glassy carbon coating. Preferably heating is for 100° C./hr to 10° C./hr until the desired final temperature is reached.

In another embodiment, the thermosettable organic resin may impregnate the flexible graphite sheet in addition to the coating methods discussed above.

The principal groups of resins suitable for use in this invention are epoxies, phenolics, urethanes and polymers of furfural and furfuryl alcohol. The preferred phenolics are phenol-formaldehyde and resorcinol-formaldehyde. Most preferred is any carbonizing phenolic resin. Furan based polymers derived from furfural or furfuryl alcohol are also suitable.

The resin system should preferably give a carbon yield in excess of about 20% and have a viscosity suitable to allow the resin to penetrate and remain in the channels until the sheet is heated and cured, preferably a neat viscosity below about 300 centipoises (cps). A solvent may be added to the resin in an amount from about 10 to about 400 weight % to help control or adjust viscosity. Examples of the solvents that may be added include ethanol, methanol, isopropanol, toluene, and acetone. For example, a preferred viscosity range for resin solutions is from about 0.1 to about 150 cps, and a more preferred range is from about 0.3 to about 20 cps.

The glassy carbon coated perforated fluid permeable flexible graphite sheet can then be activated by known techniques, such as by exposure to high temperature in the presence of oxygen, air, ozone, chlorine gas, carbon dioxide or, most advantageously, steam, for sufficient time to activate some or all of the surface of the glassy carbon layer or impregnant (which oxidizes and, thus, activates preferentially to the flexible graphite sheet itself). The particular time and temperature of exposure are interrelated and depend on the nature of the oxidant and the time desired for the reaction. For instance, with air as the oxidant, a temperature of 450° C. will accomplish the same degree of activation in several days as ozone at 100° C. for less than 10 seconds. When steam is the oxidant, temperatures of about 700° C. or higher, for from about 5 to 15 minutes are appropriate.

Catalyst metal, such as platinum, a platinum group metal or an alloy containing a platinum group metal, can then be loaded on the activated surfaces. In operation, the reaction catalyzed by the catalyst metal, that is, the dissociation of hydrogen molecules into atoms and, in the presence of the membrane and load, into constituent protons and electrons, and the reassociation of the protons and electrons, in combination with oxygen, into water, occurs at the point where the surfaces of the electrode meet (or abut) the ion exchange membrane. It is at this location and, effectively, only at this location, where dissociated electrons can be conducted along the electrode and dissociated protons can migrate across the membrane (and vice versa with respect to the cathodic side of the fuel cell). Thus, it is only on the walls of the channels formed in the sheet, at or near where the walls abut the ion exchange membrane, where catalyst needs to be loaded.

The catalyst may be loaded by any of several methods familiar to those skilled in the art. Numerous examples exist in the patent literature that disclose methods for loading metal catalysts suitable for use in fuel cells onto carbon supports. For example, U.S. Pat. No. 4,513,094 discloses a method of forming a metal alloy catalyst on a carbon support by first contacting salts of the desired catalyst metal ions dissolved in water with the carbon support followed by reduction of the metal ions and heat treatment. U.S. Pat. Nos. 4,136,059; 4,652,537; and 5,593,934 are representative of other known methods disclosed to load a metal or metal alloy catalyst onto a carbon support suitable for use as an electrocatalyst in a fuel cell.

If activation of the glassy carbon coating is insufficient for catalyst loading or undesirable, a high surface area strongly adhering coating can be obtained by including about 2 to 20 weight percent cellulosic material (e.g. milled newspaper) in the thermosettable resin. The cellulosic material suitably includes an activating material, e.g. phosphoric acid, and the cellulosic char, formed in and on the glassy carbon coating, and the surface of the glassy carbon coating is activated by heating in an oxidizing atmosphere at 700° C. for a few minutes. That is, in preparing a high surface area electrode or gas diffusion layer 10 such as shown in FIG. 1, particles of natural cellulosic materials, e.g. in the form of shredded newspaper, cotton linters, wood pulp, and the like may be treated with an activating agent and also applied to or incorporated within a resin coated sheet of compressed expanded graphite particles before the resin has fully dried. Thereafter the resin-coated sheet, with applied or incorporated natural cellulosic particles bonded thereto or embedded therein, is heated to cure and thermoset the resin and convert the resin to glassy carbon; in the course of this heat treatment, the applied and incorporated natural cellulosic particles are converted to high surface area activated carbon.

Procedures for activating and carbonizing cellulosic precursors are disclosed in U.S. Pat. No. 5,102,855, the disclosure of which is incorporated herein by reference.

DETAILED DESCRIPTION OF THE PREFERRED EMBODIMENT

Figure 2:
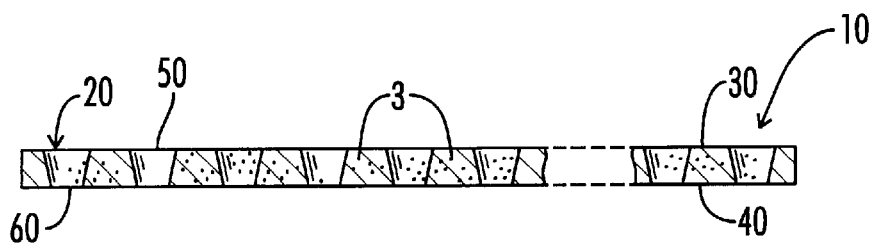
FIG. 2 is a side elevation view in section of the sheet of FIG. 1.
Figure 2A:
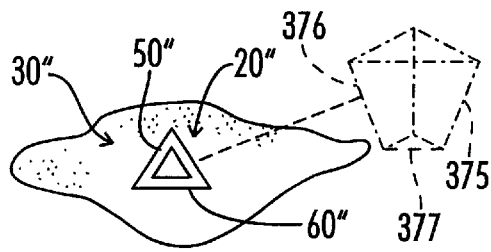
FIGS. 2(A), (B), (C), (D) show various suitable flat-ended configurations for transverse channels.
Figure 2B:
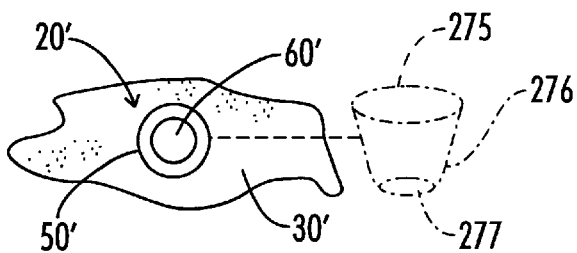
Figure 2C:
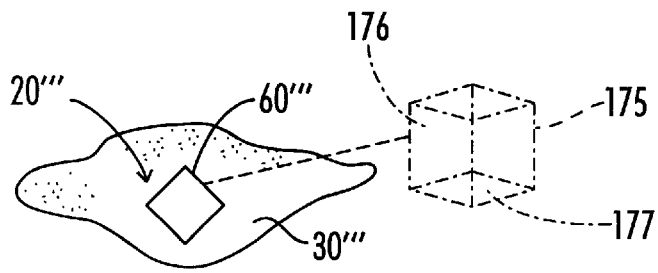
Figure 2D:
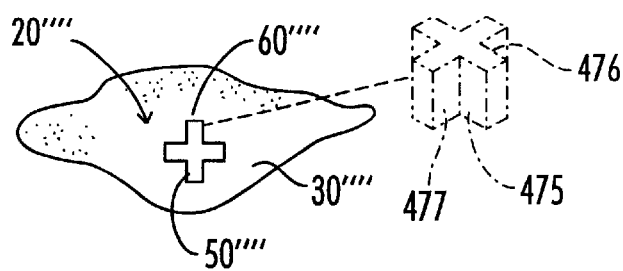

With reference to FIG. 1 and FIG. 2, a compressed mass of expanded graphite particles, in the form of a flexible graphite sheet is shown at 10. The flexible graphite sheet 10 is provided with channels 20, which are preferably smooth-sided as indicated at 67 in FIGS. 5 and 8, and which pass between the opposed surfaces 30, 40 of flexible graphite sheet 10, and are separated by walls 3 of compressed expandable graphite. The channels 20 preferably have openings 50 on one of the opposed surfaces 30 which are larger than the openings 60 in the other opposed surface 40. The channels 20 can have different configurations as shown at 20'–20'''' in FIGS. 2(A), 2(B), 2(C), 2(D) which are formed using flat-ended protrusion elements of different shapes as shown at 75, 175, 275, 375, 475 in FIGS. 1(A) and 2(A), 2(B), 2(C), 2(D) suitably formed of metal, e.g. steel and integral with and extending from the pressing roller 70 of the impacting device shown in FIG. 3. The smooth flat-ends of the protrusion elements, shown at 77, 177, 277, 377, 477, and the smooth bearing surface 73, of roller 70, and the smooth bearing surface 78 of roller 72 (or alternatively flat metal plate 79), ensure deformation and complete displacement of graphite within the flexible graphite sheet, i.e. there are no rough or ragged edges or debris resulting from the channel-forming impact. Preferred protrusion elements have decreasing cross-section in the direction away from the pressing roller 70 to provide larger channel openings on the side of the sheet that is initially impacted. The development of smooth, unobstructed surfaces 63 surrounding channel openings 60, enables the free flow of fluid in to and through smooth-sided (at 67) channels 20.

Figure 3:
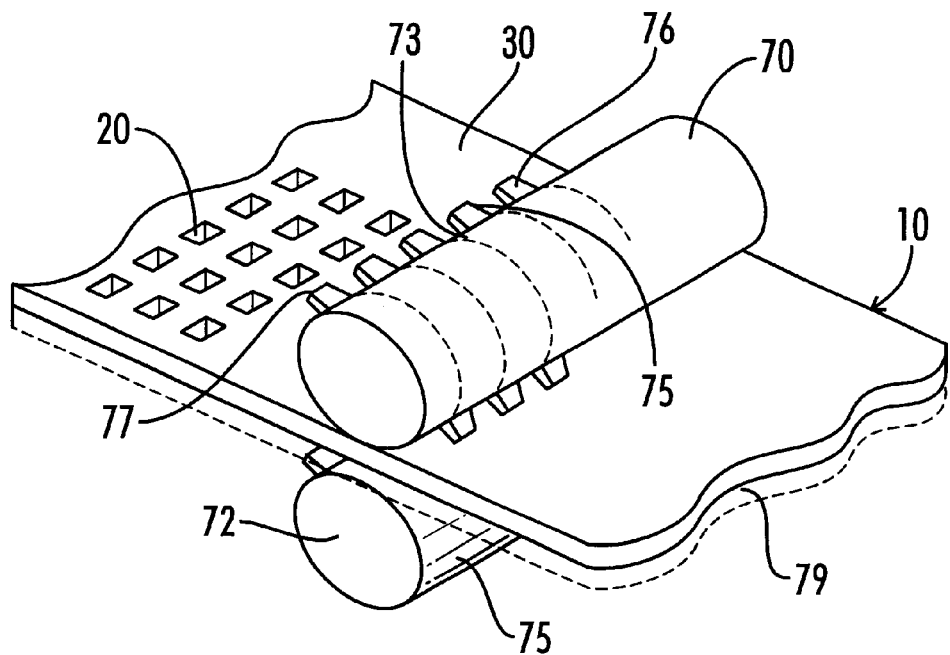
FIGS. 3, 3(A) shows a mechanism for making the article of FIG. 1.
Figure 3A:
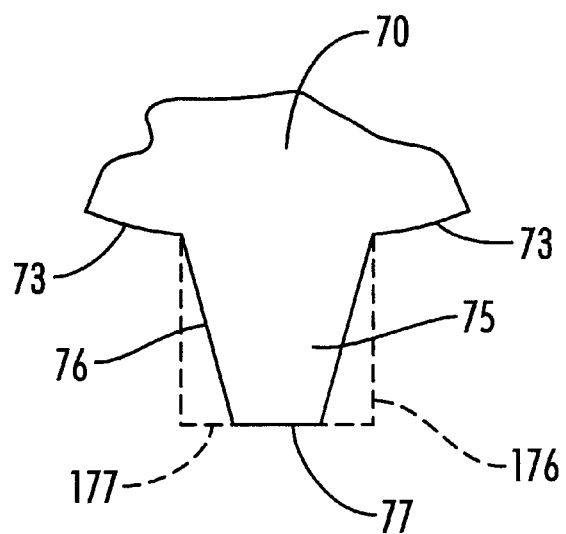

In a preferred embodiment, openings in one of the opposed surfaces are larger than the channel openings in the other opposed surface, e.g. from 1 to 200 times greater in area, and result from the use of protrusion elements having converging sides such as shown at 76, 276, 376. The channels 20 are formed in the flexible graphite sheet 10 at a plurality of pre-determined locations by mechanical impact at the predetermined locations in sheet 10 using a mechanism such as shown in FIG. 3 comprising a pair of steel rollers 70, 72 with one of the rollers having truncated, i.e. flat-ended, prism-shaped protrusions 75 which impact surface 30 of flexible graphite sheet 10 to displace graphite and penetrate sheet 10 to form open channels 20. In practice, both rollers 70, 72 can be provided with "out-of-register" protrusions, and a flat metal plate indicated at 79, can be used in place of smooth-surfaced roller 72.

Figure 4:
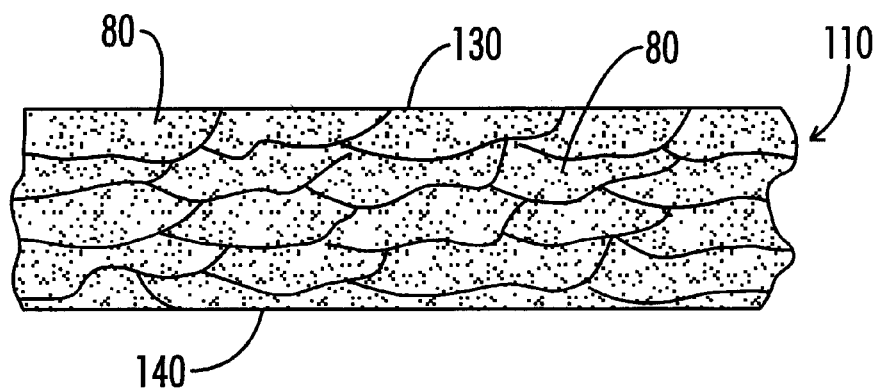
FIG. 4 shows an enlarged cross-sectioned elevation view of the oriented expanded graphite particles of flexible graphite sheet material.

FIG. 4 is an enlarged sketch of a sheet of flexible graphite 110, which shows a typical orientation of compressed expanded graphite particles 80 substantially parallel to the opposed surfaces 130, 140.

Figure 5:
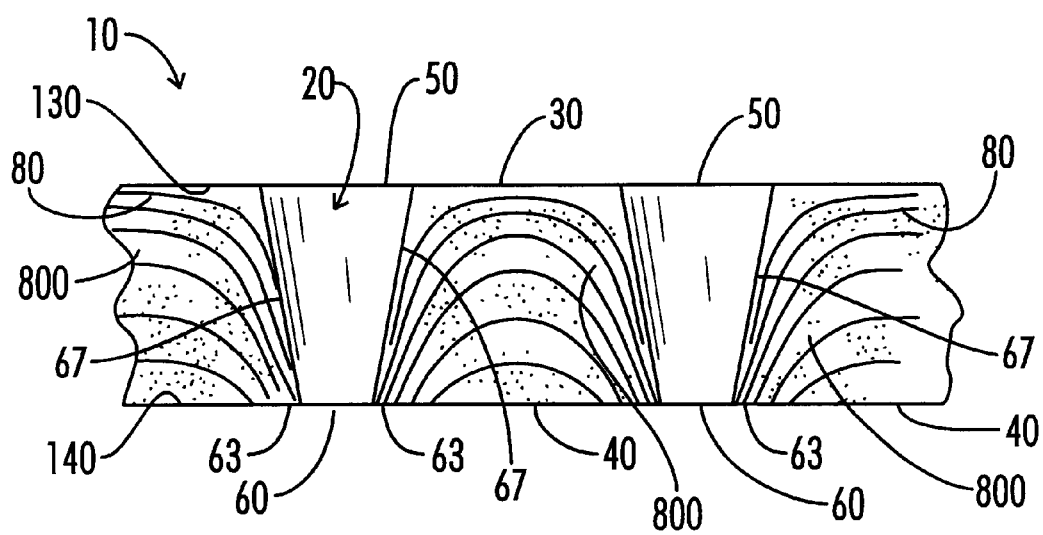
FIG. 5 is a sketch of an enlarged elevation view of an article formed from the flexible graphite sheet of FIG. 4, having channels or perforations extending through the sheet.

This orientation of the expanded graphite particles 80 results in anisotropic properties in flexible graphite sheets; i.e. the electrical conductivity and thermal conductivity of the sheet being substantially lower in the direction transverse to opposed surfaces 130, 140 ("c" direction) than in the direction ("a" direction) parallel to opposed surfaces 130, 140. In the course of impacting flexible graphite sheet 10 to form channels 20, as illustrated in FIG. 3, graphite is displaced within flexible graphite sheet 10 by flat-ended (at 77) protrusions 75 to push aside graphite as it travels to and bears against smooth surface 73 of roller 70 to disrupt and deform the parallel orientation of expanded graphite particles 80 as shown at 800 in FIG. 5. This region of 800, adjacent channels 20, showing disruption of the parallel orientation into an oblique, non-parallel orientation is optically observable at magnifications of 1000× and higher. In effect the displaced graphite is being "die-molded" by the sides 76 of adjacent protrusions 75 and the smooth surface 73 of roller 70 as illustrated in FIG. 5. This reduces the anisotropy in flexible graphite sheet 10 and thus increases the electrical and thermal conductivity of sheet 10 in the direction transverse to the opposed surfaces 30, 40. A similar effect is achieved with frusto-conical and parallel-sided peg-shaped flat-ended protrusions 275 and 175.

The sheet 10 preferably has a thickness of from about 0.07 mm to about 0.4 mm adjacent to the channels 20, and a density of from about 0.5 to about 1.4 grams per cubic centimeter.

Figure 6:
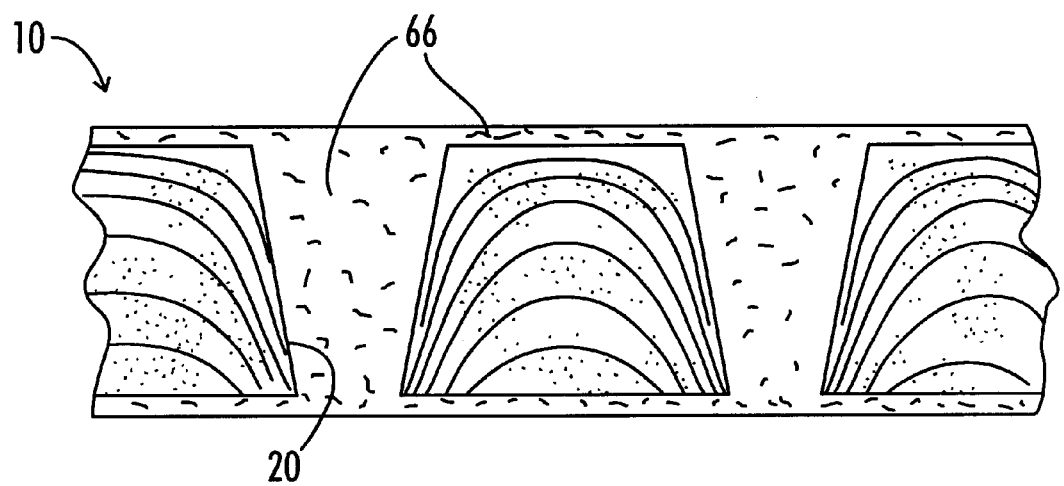
FIG. 6, shows the article of FIG. 5, after the article has been coated with resin which fills the channels.
Figure 7:
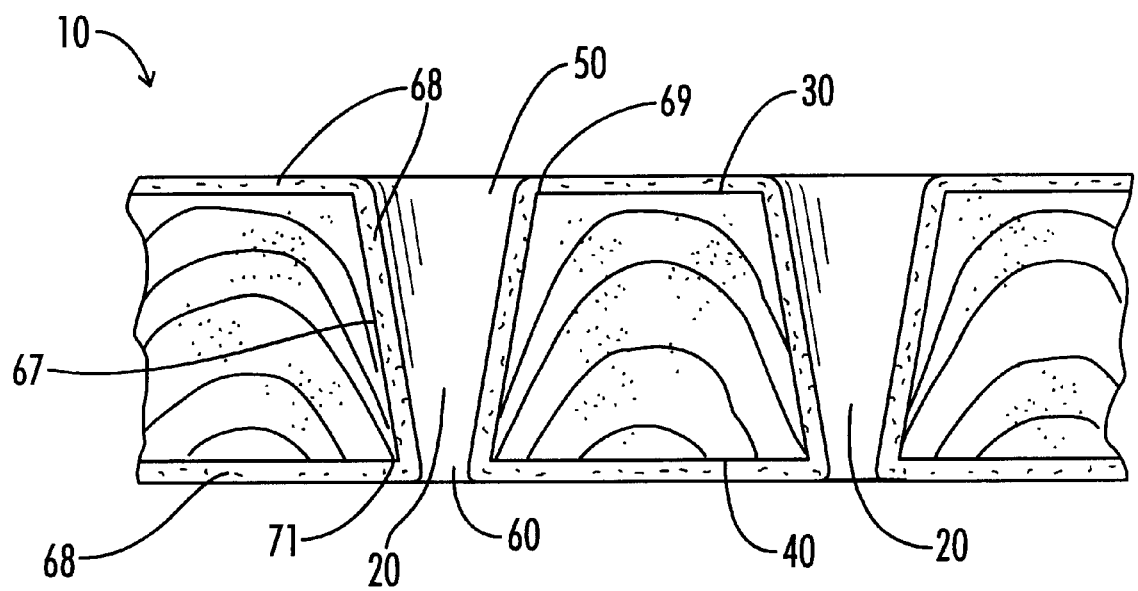
FIG. 7, shows the article of FIG. 6, after the article has been cured and baked and the channels have re-opened, leaving open channels with the walls and edges thereof coated with the resin.

The glassy carbon coating 68 and/or impregnant on the surfaces of flexible graphite sheet 10 is achieved by treating a channeled sheet such as shown in FIG. 5, with a resin solution and subsequently converting the resin to glassy carbon. This process is illustrated in FIGS. 6 and 7. Alternatively, a resin treated sheet can be channeled and the resin then converted to glassy carbon. Also, as described above, natural cellulosic particles may be bonded to sheet 10.

After the channels or perforations 20 have been formed in the sheet 10, as shown in FIG. 5, The sheet 10 is coated with a thermosettable organic resin 66. This coating step can be accomplished by any suitable method including rolling, spraying, gauging, dipping and brushing. The coating step results in the filling of at least a portion of the channels 20 with the resin 66, as seen in FIG. 6. Preferably, the portion filled is at least about 20%, more preferably greater than about 50%, and most preferably about 100%.

The principal groups of resins suitable for use in this invention are epoxies, phenolics, urethanes and polymers of furfural and furfuryl alcohol. The preferred phenolics are phenol-formaldehyde and resorcinol-formaldehyde. Most preferred is any carbonizing phenolic resin. Furan based polymers derived from furfural or furfuryl alcohol are also suitable.

The resin system should preferably give a carbon yield in excess of about 20% and have a viscosity suitable to allow the resin to penetrate and remain in the channels until the sheet is heated and cured, preferably a neat viscosity in the range of from about 100 to about 300 centipoises (cps). A solvent may be added to the resin in an amount from about 10 to about 400 weight % to help control or adjust viscosity. Examples of the solvents that may be added include ethanol, methanol, isopropanol, toluene, and acetone. For example, a preferred viscosity for the resin solutions is from about 0.1 to about 150 cps, and more preferably from about 0.3 to about 20 cps.

After coating the sheet and filling the perforations with resin, the sheet is heated to cure and bake the sheet, and during that heating process the resin in at least a portion of the channels 20 shrinks to reopen the channels, and the resin is converted to a glassy carbon coating 68 upon the inner walls 67 of the channels 20, as seen in FIG. 7. Preferably, the portion of the channels 20 which were both filled and reopened is at least about 20% of the total number of channels in the sheet, more preferably greater than about 50%, and most preferably about 100%. The heating preferably includes heating to a temperature in the range of from about 500° C. to about 1600° C. in an inert atmosphere.

Figure 8:
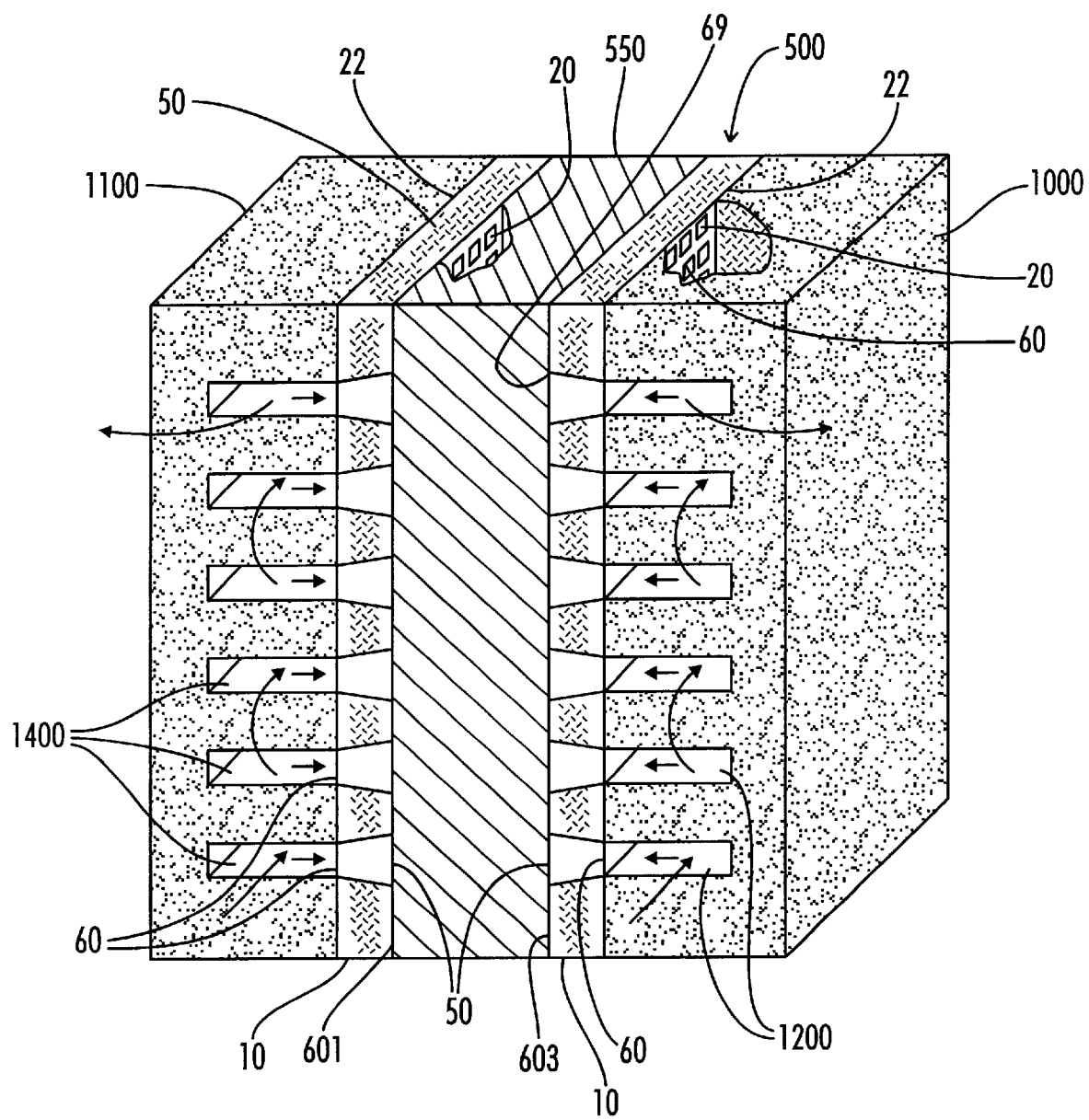
FIGS. 8, 9 and 9(A) show a fluid permeable electrode assembly which includes a transversely permeable article made in accordance with a method of present invention.

The glassy carbon coating 68 also may cover all or part of the opposed surfaces 30 and 40 of sheet 10, as shown in FIG. 7, depending upon how well the resin 66 covered and/or adhered to surfaces 30 and 40. However, as previously noted, the goal of the present invention is to place the glassy carbon, and ultimately a catalyst which will be loaded on the carbon, on the walls 67 of the channels 20, and particularly on the edges 69 and 71. When the larger opening 50 is placed adjacent the PEM 550, as shown in FIG. 8, it is the edge 69 adjacent opening 50 which is the most desired spot for placement of the glassy carbon coating 68. It is at this edge 69 where the PEM 550 and the catalyst will meet to accommodate the chemical reactions which result in the generation of electrical energy from the hydrogen fuel and air flowing through the fuel cell.

The glassy carbon coated and/or loaded perforated fluid permeable flexible graphite sheet 10 of FIG. 7 can then be activated by known techniques, such as by exposure to high temperature in the presence of oxygen, air, ozone, chlorine gas, carbon dioxide or, most advantageously, steam, for sufficient time to activate some or all of the surface of the glassy carbon 68. For example, the glassy carbon can be heated to a temperature of about 700° C. or higher in the presence of steam.

Catalyst metal 600 can then be loaded on the activated carbon, most advantageously at or near the locations where the edges 69 of the channel walls are to abut an ion exchange membrane in an electrochemical fuel cell. The catalyst is preferably a platinum or platinum group metal or a platinum group alloy.

Figure 9:
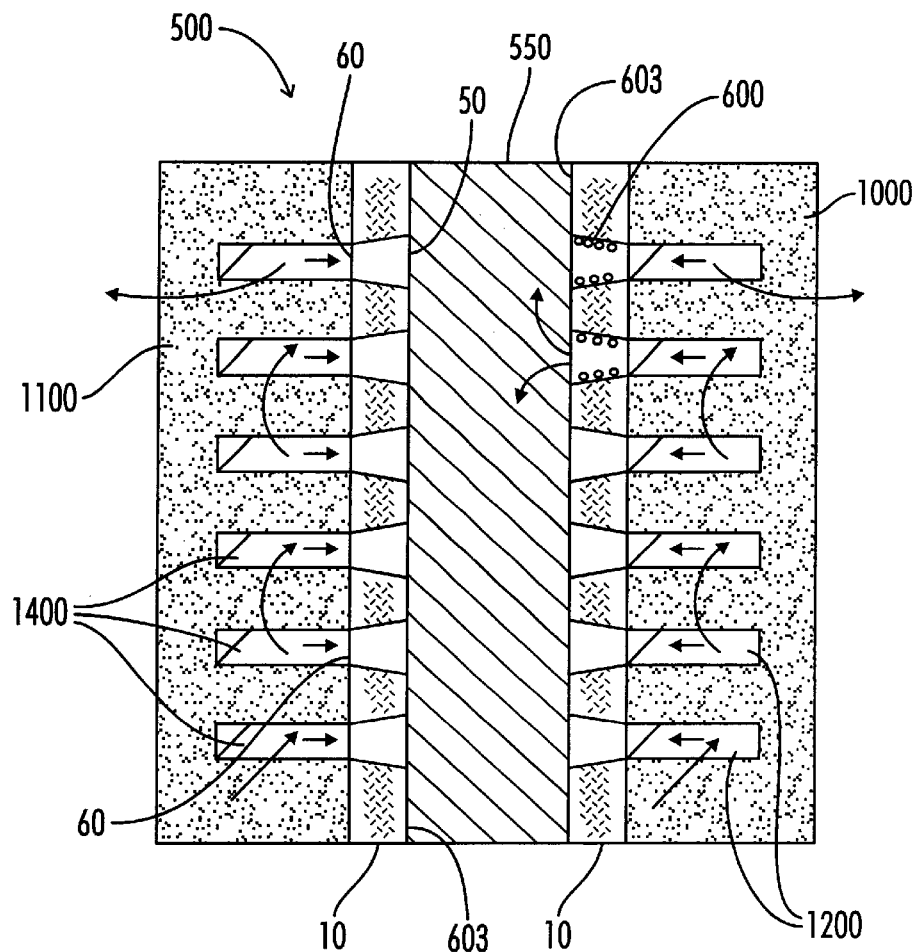
Figure 9A:
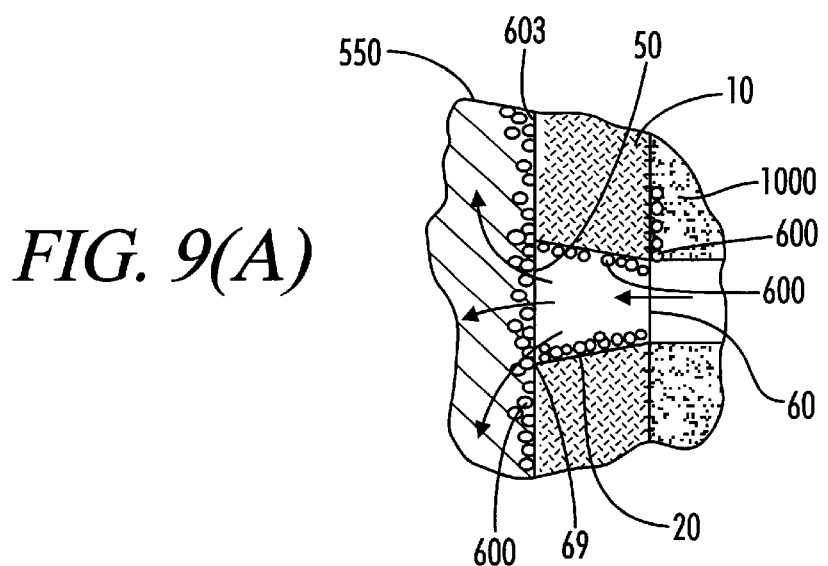

The perforated gas permeable flexible graphite sheet 10 of FIG. 7 can be used as an electrode in an electrochemical fuel cell 500 shown schematically in FIGS. 8, 9 and 9(A).

FIG. 8, FIG. 9 and FIG. 9(A) show, schematically, the basic elements of an electrochemical Fuel Cell, more complete details of which are disclosed in U.S. Pat. Nos. 4,988,583 and 5,300,370 and PCT WO 95/16287 (Jun. 15, 1995) and each of which is incorporated herein by reference.

With reference to FIG. 8, FIG. 9 and FIG. 9(A), the Fuel Cell indicated generally at 500, comprises electrolyte in the form of a plastic e.g. a solid polymer ion exchange membrane 550; perforated flexible graphite sheet electrodes 10 in accordance with the present invention; and flow field plates 1000, 1100 which respectively abut electrodes 10. Pressurized fuel is circulated through grooves 1400 of fuel flow field plate 1100 and pressurized oxidant is circulated through grooves 1200. In operation, the fuel flow field plate 1100 becomes an anode, and the oxidant flow field plate 1000 becomes a cathode with the result that an electric potential, i.e. voltage is developed between the fuel flow field plate 1000 and the oxidant flow field plate 1100. The above described electrochemical fuel cell is combined with others in a fuel cell stack to provide the desired level of electric power as described in the above-noted U.S. Pat. No. 5,300, 370.

One significant difference lies in the fact that the catalyst 600 is loaded on the electrode 10 of the present invention. In this way, the catalyst metal is present in the transverse channels 20 through electrode 10, so that the amount of catalyst employed is minimized while maximizing the effectiveness of the catalyst, especially where the catalyst is only loaded at or near the edges 69 where the walls of electrode 10 abut ion exchange membrane 550.

The operation of Fuel Cell 500 requires that the electrodes 10 be porous to the fuel and oxidant fluids, e.g. hydrogen and oxygen, to permit these components to readily pass from the grooves 1400, 1200 through electrodes 10 to contact the catalyst 600 on the surfaces of the channels 20, as shown in FIG. 7(A), and enable protons derived from hydrogen to migrate through ion exchange membrane 550. In the electrode 10 of the present invention, channels 20 are positioned to adjacently cover grooves 1400, 1200 of the flow field plates so that the pressurized gas from the grooves passes through the smaller openings 60 of channels 20 and exits the larger openings 50 of channels 20. The initial velocity of the gas at the smaller openings 60 is higher than the gas flow at the larger openings 50 with the result that the gas is slowed down when it contacts the catalyst 600 on the surfaces of channels 20 and the residence time of gas-catalyst contact is increased and the area of gas exposure at the membrane 550 is maximized. This feature, together with the increased electrical conductivity of the flexible graphite electrode of the present invention enables more efficient fuel cell operation. Of course, it will be recognized that there are situations where it may be desirable to orient electrode 10 such that pressurized gas from the grooves 1400 or 1200 of the flow field plates 1000, 1100 passes through the larger opening 50 of channels 20 and exits through the smaller openings 60 of channels 20.

Other features of the invention will become apparent in the course of the following example which is given for illustration of the invention and is not intended to be limiting thereof.

EXAMPLE

In producing an article in accordance with the present invention, a sheet of compressed expanded graphite particles having transverse channels, as illustrated in FIG. 1 and FIG. 2, is treated. In this example, a sheet of compressed graphite is treated by dipping with a solution of liquid carbonizing phenolic resin. The resin is available from Borden, Westchester, Ill. The resin solultion is diluted with solvent to a viscosity of 0.520 cps. The solution fills the transverse channels. The sheet is subsequently dried and heated to a temperature of 225° C. at a rate of 50° C./hr to thermoset the resin. During this heating period the resin shrinks and the transverse channels reopen with a coating of the resin adhered to the walls of the transverse channels. The sheet is then heated to temperatures of about 500° C. and higher, to about 1600° C. for a period of 4–36 hrs, to convert the thermoset resin to glassy carbon.

All cited patents and publications referred to in this application are herein expressly incorporated by reference.

The above description is intended to enable the person skilled in the art to practice the invention. It is not intended to detail all of the possible variations and modifications that will become apparent to the skilled worker upon reading the description. It is intended, however, that all such modifications and variations be included within the scope of the invention that is defined by the following claims. The claims are intended to cover the indicated elements and steps in any arrangement or sequence that is effective to meet the objectives intended for the invention, unless the context specifically indicates the contrary.

What is claimed is:

1. A method of manufacturing an electrode for an electrochemical fuel cell, comprising:

(a) providing a sheet of compressed mass of expanded graphite particles having a plurality of perforations defined by walls of the expanded graphite particles, and the perforations passing through the sheet between first and second opposed surfaces of the sheet;

(b) coating the sheet with a thermosettable organic resin, said coating step comprising filling a portion of said perforations with the thermosettable organic resin;

(c) curing and baking the sheet, and reopening a portion of the filled perforations during the curing and baking step; and (d) activating the thermosettable organic resin to form a high surface area carbon on the walls of the perforations;

wherein at least about 20% of the perforations of the sheet are both filled in step (b) and reopened in step (c).

2. The method of claim 1, wherein coating step comprises a technique selected from the group consisting of rolling, spraying, gauging, dipping, and brushing.

3. The method of claim 1, wherein the coating step comprises dipping.

4. The method of claim 1, wherein said thermosettable organic resin is selected from the group consisting of phenolic resins, epoxy resins, urethane resins, and polymers of furfural and furfuryl alcohol.

5. The method of claim 1, wherein said thermosettable organic resin is a carbonizing phenolic resin.

6. The method of claim 1, wherein said activating step comprises:

(d)(1) heating to about 500° C. to about 1600° C. in an inert atmosphere, forming a coating of glassy carbon on the walls of the perforations; and (d)(2) exposing the glassy carbon to high temperature in the presence of an oxidant, forming a high surface area carbon.

7. The method of claim 6, wherein the oxidant is selected from the group consisting of oxygen, air, ozone, chlorine gas, carbon dioxide and steam.

8. The method of claim 6, wherein said high temperature is about 700° C. or higher and the oxidant is steam.

9. The method of claim 1, wherein said catalyst is a platinum or platinum group metal or a platinum group alloy.

10. The method of claim 1, wherein the graphite sheet has a thickness of 0.07 mm to 0.4 mm adjacent to the perforations and a density of 0.5 to 1.4 grams per cubic centimeter.

11. The method of claim 1, wherein said thermosettable organic resin is in solution with a solvent and the solution has a viscosity of from about 0.1 to about 150 centipoises (cps).

12. The method of claim 11, wherein said solution has a viscosity of from about 0.3 to about 20 centipoises (cps).

13. The method of claim 1, further comprising, after step (c), bonding carbonized and activated natural cellulosic particles to the sheet.

14. The method of claim 1, wherein greater than about 50% of the perforations of the sheet are both filled in step (b) and reopened in step (c).

15. A method for manufacturing a component for a fuel cell, comprising:

(a) providing a sheet of a compressed mass of graphite particles having a plurality of transverse fluid channels having walls defined by the graphite particles and said transverse fluid channels passing through the sheet between first and second parallel, opposed surfaces of the sheet;

(b) filling a portion of said transverse fluid channels with a thermosettable resin;

(c) reopening said transverse fluid channels by curing and baking said sheet to selectively place the resin on the walls of a portion of the transverse fluid channels; and (d) activating said resin producing a high surface area carbon attached to a portion of the walls of the transverse fluid channels;

wherein at least about 20% of the transverse channels passing through the sheet are filled in step (b) and reopened in step (c).

16. The method of claim 15, wherein step (d) comprises:

heating the resin in an inert atmosphere to about 500° C.–1600° C. to form a glassy carbon coating; and exposing the glassy carbon to high temperatures in the presence of an oxidant to form a high surface area carbon.

17. The method of claim 15, wherein said resin is selected from the group consisting of phenolic resins, epoxy resins, urethane resins, and polymers of furfural and furfuryl alcohol.

18. The method of claim 15, wherein said thermosettable organic resin is in solution with a solvent and the solution has a viscosity of from about 0.1 to about 150 centipoises (cps).

19. The method of claim 18, wherein said solution has a viscosity of about 0.3 to about 20 centipoises (cps).

20. The method of claim 15, wherein said catalyst is a platinum, platinum group metal or an alloy containing a platinum group metal.

21. The method of claim 15, further comprising, after the heating step, bonding carbonized and activated natural cellulosic particles to the glassy carbon.

22. The method of claim 15, wherein greater than about 50% of the transverse channels passing through the sheet are filled in step (b) and reopened in step (c).

23. A method of manufacturing an electrode for an electrochemical fuel cell, comprising:

(a) providing a sheet of compressed mass of expanded graphite particles having a plurality of perforations defined by walls of the expanded graphite particles, and the perforations passing through the sheet between first and second opposed surfaces of the sheet;

(b) coating the sheet with a thermosettable organic resin, said coating step comprising filling a portion of said perforations with the thermosettable organic resin;

(c) curing and baking the sheet, and reopening a portion of the filled perforations during the curing and baking step; and (d) activating the thermosettable organic resin to form a high surface area carbon on the walls of the perforations, wherein said activating step comprises:

(d)(1) heating to about 500° C. to about 1600° C. in an inert atmosphere, forming a coating of glassy carbon on the walls of the perforations; and (d)(2) exposing the glassy carbon to a temperature of about 700° C. or higher in the presence of steam, forming a high surface area carbon.

* * * * *